No. 707,699. Patented Aug. 26, 1902.
M. R. HUTCHISON.
CHARGING SWITCH.
(Application filed Nov. 15, 1901.)

(No Model.)

Witnesses
Inventor
M. R. Hutchison
By his Attorney

UNITED STATES PATENT OFFICE.

MILLER R. HUTCHISON, OF NEW YORK, N. Y., ASSIGNOR, BY MESNE ASSIGNMENTS, TO HUTCHISON ACOUSTIC COMPANY, A CORPORATION OF NEW JERSEY.

CHARGING-SWITCH.

SPECIFICATION forming part of Letters Patent No. 707,699, dated August 26, 1902.

Application filed November 15, 1901. Serial No. 82,350. (No model.)

*To all whom it may concern:*

Be it known that I, MILLER REESE HUTCHISON, a citizen of the United States, residing at the city of New York, in the borough of Manhattan and State of New York, have invented certain new and useful Improvements in Charging-Switches, of which the following is a full, clear, and exact description.

This invention is a device by which unskilled persons can conveniently connect a storage battery with a source of electricity in the proper manner for charging. It is well understood that the poles of the charging-circuit must be connected with the poles of the battery in such a manner that the current will flow through the battery in a direction contrary to the direction of discharge, and while persons skilled in the handling of such apparatus are familiar with appliances and means for accomplishing this charging process properly persons unskilled who find it necessary to use storage batteries must be provided with ready and convenient devices for charging which will prevent injury to the battery.

The device is intended especially for use in connection with portable storage batteries for general use and which, being in the hands of unskilled persons and requiring to be charged often and at different locations, cannot be damaged by wrong charging.

The device herein described will make the charging operation simple and accurate.

The device itself may be called a "charging-switch" and embodies a polarized electromagnet, a switch controlled thereby, and suitable means for connecting the device with the source of current and the battery.

Figure 1:
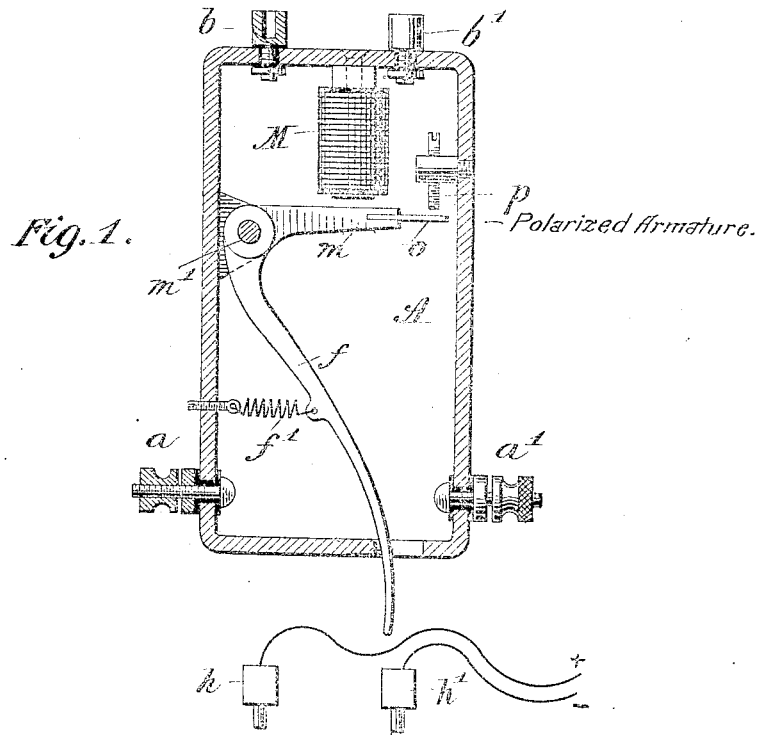
Figure 2:
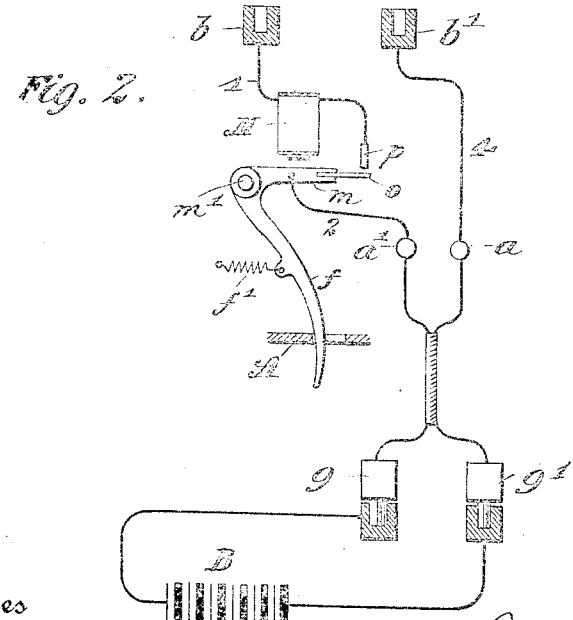

In the accompanying drawings, Figure 1 is a sectional view of the charging-switch, and Fig. 2 is a diagram of the circuits.

The switch mechanism is inclosed in a suitable casing A, provided externally with two binding-posts $a$ and $a'$ for connecting the terminals of the battery. It is also provided with two sockets $b$ and $b'$, into which plugs connecting with the charging-circuit may be inserted. Inside of the casing is fixed an electromagnet M, whose armature $m$ is polarized and therefore responsive only when current of a certain polarity flows through the magnet. The armature carries a contact-finger $o$, adapted to connect with a contact $p$ when the magnet attracts the armature. With the armature is also connected a lever or arm $f$, which extends through a slot in the box a short distance, so that its position may be seen. A spring $f'$ acts upon the lever in a way to withdraw the armature from the contact $p$. The pivotal point for the armature-lever $f$ is at $m'$. The projecting end of the lever $f$ serves as an indicator to show the condition of the contacts $o$ and $p$ with respect to each other. The circuits will be described in connection with the operation, which is as follows: When the battery is to be charged, plugs $g$ $g'$ on the end of a flexible cord, one of which is larger than the other, are inserted into or connected with the terminals of the battery B, which they respectively fit, as shown in Fig. 2. The other two ends of the cord are then connected with the binding-posts $a$ and $a'$. Then the two plugs $h$ and $h'$, connected, respectively, with the two sides of the charging-circuit, are inserted into the sockets $b$ and $b'$. A circuit is then established through the battery as follows: from one side of the main circuit to the socket $b$, thence by wire 1 through magnet M to the contact $p$. From the armature $m$ a wire 2 leads to binding-post $a'$. Thence the circuit leads through the cord and the battery and again through the cord to the binding-post $a$. From $a$ a wire 4 leads to the socket $b'$. The operator then moves the lever $f$ a full stroke to the right, whereupon the circuit is completed between the contacts $o$ and $p$. If the current is flowing in the right direction for charging the battery, the magnet will hold the contacts $o$ and $p$ together and the lever $f$ will remain to the right and the battery will charge until the circuit is broken by moving the lever to the left or by separating any of the connections. If on moving the lever to the right in the first instance it was not retained in that position, but was immediately retracted to the left-hand position by the spring $f'$, the operator would know that the current was flowing in the wrong direction to charge the battery, and he will then reverse the position of the plugs h h' in the sockets b b'. This reverses the direction of the current, and the battery will be properly charged.

Having described my invention, I claim—

1. The combination of a storage battery, a source of electricity, a charging-switch consisting of a polarized electromagnet and contacts controlled thereby, a circuit including the battery, the source of electricity, the magnet and the contacts in series and means for manually closing the contacts to complete the circuit.

2. The combination of a storage battery, a source of electricity, a charging-switch consisting of a polarized electromagnet and contacts controlled thereby, a circuit including the battery, the source of electricity, the magnet and the contacts in series, means for manually closing the contacts to complete the circuit and an indicator adapted to show whether the circuit remains closed.

3. A charging-switch for storage batteries, consisting of an electromagnet and a polarized armature, contacts controlled by said armature and covered from view and an indicator showing the position of the contacts.

4. A charging-switch consisting of a box or casing, containing an electromagnet, a polarized armature for the electromagnet, contacts controlled by the polarized armature, the armature extending to the outside of the box and thus showing its position, and means for connecting a source of electricity and a battery in series with the magnet and contacts, substantially as described.

In witness whereof I subscribe my signature in presence of two witnesses.

MILLER R. HUTCHISON.

Witnesses:
 FRANK S. OBER,
 WALDO M. CHAPIN.